United States Patent
Zaifman et al.

(10) Patent No.: US 11,386,294 B2
(45) Date of Patent: *Jul. 12, 2022

(54) DATA HARVESTING FOR MACHINE LEARNING MODEL TRAINING

(71) Applicant: AT&T Intellectual Property I, L.P., Atlanta, GA (US)

(72) Inventors: Arthur Zaifman, Millburn, NJ (US); John Mark Mocenigo, Philadelphia, PA (US); Glen Zdroik, Long Valley, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,779

(22) Filed: Nov. 30, 2020

(65) Prior Publication Data

US 2021/0081713 A1    Mar. 18, 2021

Related U.S. Application Data

(63) Continuation of application No. 16/132,547, filed on Sep. 17, 2018, now Pat. No. 10,902,287.

(51) Int. Cl.
*H04W 4/38* (2018.01)
*G06K 9/62* (2022.01)
(Continued)

(52) U.S. Cl.
CPC ........ *G06K 9/6256* (2013.01); *G06K 9/6228* (2013.01); *G06N 20/00* (2019.01); *H04W 4/021* (2013.01); *H04W 4/38* (2018.02)

(58) Field of Classification Search
CPC .................. H04W 4/021; H04W 4/38
See application file for complete search history.

(56) References Cited

U.S. PATENT DOCUMENTS 9,349,104 B2    5/2016   O'Neill et al.
9,396,253 B2    7/2016   Porpora et al.
(Continued)

FOREIGN PATENT DOCUMENTS

WO    WO 2018/149898    8/2018

OTHER PUBLICATIONS

International Search Report and Written Opinion dated Dec. 13, 2019 issued in International Application No. PCT/US2019/051218.
(Continued)

*Primary Examiner* — Michael T Vu
(74) *Attorney, Agent, or Firm* — Hartman & Citrin LLC

(57) ABSTRACT

Concepts and technologies disclosed herein are directed to data harvesting for machine learning model training. According to one aspect of the concepts and technologies disclosed herein, a network data collection system can identify a target data source location from which to harvest data for a machine learning system to utilize during a machine learning model training process. The data can be associated with a plurality of mobile communications devices operating in communication with at least one base station of a mobile communications network that serves the target data source location. The network data collection system can collect the data and provide the data to the machine learning system. The machine learning system, in turn, can create a training data set for use during the machine learning model training process based, at least in part, upon the data.

20 Claims, 8 Drawing Sheets

(51) Int. Cl.
    *G06N 20/00*     (2019.01)
    *H04W 4/021*     (2018.01)

(56) References Cited

U.S. PATENT DOCUMENTS

| | | |
|---|---|---|
| 9,807,601 B2 | 10/2017 | Cronin |
| 9,838,843 B1 | 12/2017 | Bajaj et al. |
| 9,967,391 B2 | 5/2018 | Frenz et al. |
| 9,998,457 B1 | 6/2018 | Barillaud et al. |
| 9,998,860 B2 | 6/2018 | Damnjanovic et al. |
| 10,039,016 B1 | 7/2018 | Larish et al. |
| 10,044,757 B2 | 8/2018 | Qureshi et al. |
| 2014/0237595 A1 | 8/2014 | Sridhara et al. |
| 2016/0379105 A1 | 12/2016 | Moore, Jr. et al. |
| 2017/0116642 A1* | 4/2017 | Meyer ................ G06Q 30/0277 |
| 2018/0121576 A1 | 5/2018 | Mosher et al. |
| 2018/0365619 A1 | 12/2018 | Hardy |
| 2019/0205667 A1 | 7/2019 | Avidan |
| 2019/0266622 A1* | 8/2019 | Turnbull ................ G06N 20/00 |
| 2020/0213830 A1* | 7/2020 | Zhao ................ H04M 1/72415 |

OTHER PUBLICATIONS

U.S. Office Action dated Mar. 26, 2020 in U.S. Appl. No. 16/132,547.
U.S. Notice of Allowance dated Jul. 8, 2020 in U.S. Appl. No. 16/132,547.
U.S. Notice of Allowance dated Oct. 27, 2020 in U.S. Appl. No. 16/132,547.

* cited by examiner

DATA HARVESTING FOR MACHINE LEARNING MODEL TRAINING

CROSS-REFERENCE TO RELATED APPLICATIONS

This application is a continuation of and claims priority to U.S. patent application Ser. No. 16/132,547, entitled "Data Harvesting for Machine Learning Model Training," filed Sep. 17, 2018, now U.S. Pat. No. 10,902,287, which is incorporated herein by reference in its entirety.

BACKGROUND

Machine learning is an area of computer science in which computer systems are able to learn without being explicitly programmed. Machine learning is used in many fields of science and technology from speech recognition to artificial intelligence to advertising, among many others. Machine learning models are created based upon training data. For some applications of machine learning, data available for training new machine learning models is vast and computationally expensive and time-consuming to acquire.

SUMMARY

Concepts and technologies disclosed herein are directed to data harvesting for machine learning model training. According to one aspect of the concepts and technologies disclosed herein, a network data collection system can identify a target data source location from which to harvest data for a machine learning system to utilize during a machine learning model training process. The data can be associated with a plurality of mobile communications devices operating in communication with at least one base station of a mobile communications network that serves the target data source location. The network data collection system can collect the data and provide the data to the machine learning system. The machine learning system, in turn, can create a training data set for use during the machine learning model training process based, at least in part, upon the data.

In some embodiments, the network data collection system can identify the target data source location, at least in part, by establishing a perimeter around an area containing the at least one base station. In these embodiments, the network data collection system can collect, from a collection point, network packets from the at least one base station positioned inside the perimeter. Alternatively, the network data collection system can collect, from at least one collection point, network packets from the at least one base station positioned inside the perimeter and at least one further base station positioned outside the perimeter. The network data collection system can filter out a subset of the network packets that are collected from the at least one further base station positioned outside the perimeter.

In some embodiments, the data can include a plurality of requests associated with at least one application executing on at least a portion of the plurality of mobile communications devices. The plurality of requests, in some embodiments, can be generated after an airplane mode function is disabled on the portion of the plurality of mobile communications devices. In some embodiments, the data is responsive, at least in part, to a common action among users of the plurality of mobile communications devices.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, and be within the scope of this disclosure.

DETAILED DESCRIPTION

While the subject matter described herein may be presented in the general context of program modules that execute in conjunction with the execution of an operating system and application programs on a computer system, computing device, mobile device, and/or other computing resource, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
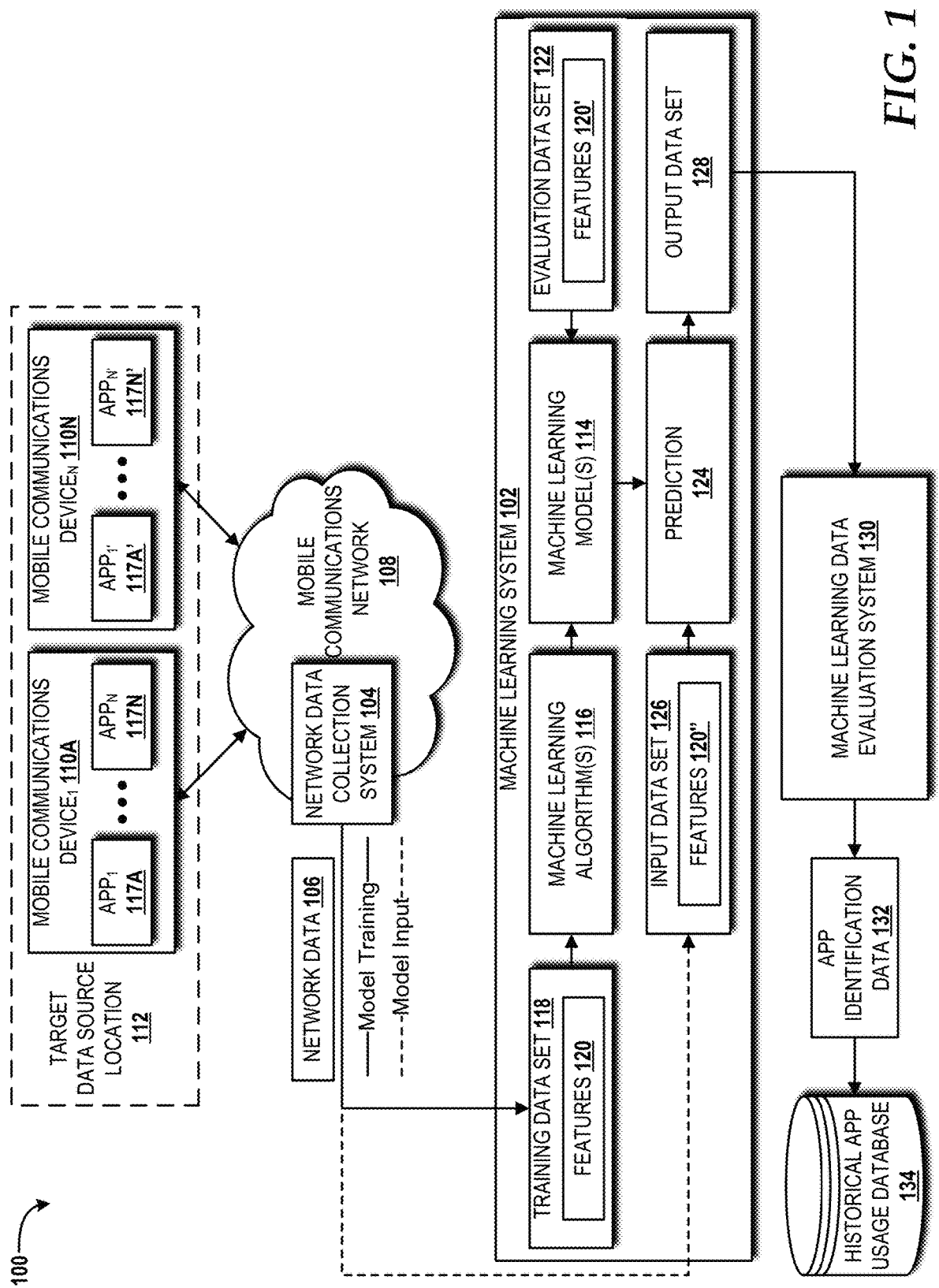
FIG. 1 is a block diagram illustrating aspects of an illustrative operating environment in which embodiments of the concepts and technologies disclosed herein can be implemented.

Referring now to FIG. 1, aspects of an illustrative operating environment 100 in which embodiments of the concepts and technologies disclosed herein can be implemented will be described. The illustrated operating environment 100 includes a machine learning system 102 operating in communication with a network data collection system 104 that can collect network data 106 from a mobile communications network 108 with which a plurality of mobile communications devices 110A-110N located within a target data source location 112 are in communication.

In some embodiments, the machine learning system 102 is provided as a software system executed, at least in part, by one or more processors of a computing system (an example architecture of which is illustrated and described with reference to FIG. 6). Alternatively, the machine learning system 102 can be external to one or more computing systems and can be made accessible either locally (e.g., via a local area network or "LAN") or remotely, whereby the machine learning system 102 operates, for example, off-site, such as in a cloud computing platform (an example architecture of which is illustrated and described with reference to FIG. 5), a server host, or the like.

The illustrated machine learning system 102 includes machine learning model(s) 114 (hereinafter referred to in the singular as "machine learning model 114" or in the plural as "machine learning models 114"). The machine learning model(s) 114 can be created by the machine learning system 102 based upon one or more machine learning algorithms 116 (hereinafter referred to in the singular as "machine learning algorithm 116" or in the plural as "machine learning algorithms 116"). The machine learning algorithm(s) 116 can be any existing, well-known algorithm, any proprietary algorithms, or any future machine learning algorithm. Some example machine learning algorithms 116 include, but are not limited to, gradient descent, linear regression, logistic regression, linear discriminant analysis, classification tree, regression tree, Naive Bayes, K-nearest neighbor, learning vector quantization, support vector machines, and the like. Those skilled in the art will appreciate the applicability of various machine learning algorithms 116 based upon the problem(s) to be solved by machine learning via the machine learning system 102. In context of the concepts and technologies disclosed herein, the machine learning algorithms 116 are used to identify one or more applications 117 (shown as $APP_1$ 117A ... $APP_N$ 117N; hereinafter referred to in the singular as "application or APP 117" or in the plural as "applications or APPs 117") executed by one or more processors of the mobile communications devices 110A and one or more applications 117' (shown as $APP_1$. 117A' ... $APP_N$' 117N'; hereinafter referred to in the singular as "application or APP 117" or in the plural as "applications or APPs 117") executed by one or more processors of the mobile communications device$_N$ 110N.

The machine learning system 102 can control the creation of the machine learning models 114 via one or more training parameters. In some embodiments, the training parameters are selected by one or more users, such as network analysts or other entities associated with the mobile communications network 108. Alternatively, in some embodiments, the training parameters are automatically selected based upon data, such as the network data 106 or a subset thereof, provided in one or more training data sets 118. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 116 converges to the optimal weights. The machine learning algorithm 116 can update the weights for every data example included in the training data set 118. The size of an update is controlled by the learning rate. A learning rate that is too high might prevent the machine learning algorithm 116 from converging to the optimal weights. A learning rate that is too low might result in the machine learning algorithm 116 requiring multiple training passes to converge to the optimal weights.

The model size is regulated by a number of input features ("features") 120 in the training data set 118. A greater number of the features 120 yields a greater number of possible patterns that can be determined from the training data set 118. The model size should be selected to balance the resources (e.g., compute, memory, storage, etc.) needed for training and the predictive power of a resultant machine learning model 114.

The number of training passes indicates how many training passes the machine learning algorithm 116 makes over the training data set 118 during the training process. The number of training passes can be adjusted based, for example, on the size of the training data set 118, with larger training data sets being exposed to fewer training passes in consideration of time and/or resource utilization. The effectiveness of the resultant machine learning model 114 can be increased by multiple training passes.

Data shuffling is a training parameter designed to prevent the machine learning algorithm 116 from reaching false optimal weights due to the order in which data contained in the training data set 118 is processed. For example, data provided in rows and columns might be analyzed first row, second row, third row, etc., and thus an optimal weight might be obtained well before a full range of data from the training data set 118 has been considered. By data shuffling, the data contained in the training data set 118 can be analyzed more thoroughly and mitigate bias in the resultant machine learning model 114.

Regularization is a training parameter that helps to prevent the machine learning model 114 from memorizing training data from the training data set 118. In other words, the machine learning model 114 fits the training data set 118, but the predictive performance of the machine learning model 114 is not acceptable. Regularization helps the machine learning system 102 avoid this overfitting/memorization problem by adjusting extreme weight values of the features 120. For example, a feature 120 that has a small weight value relative to the weight values of the other features 120 in the training data set 118 can be adjusted to zero.

The machine learning system 102 can determine model accuracy after training by using one or more evaluation data sets 122 containing the same features 120' as the features 120 in the training data set 118. This also prevents the machine learning model 114 from simply memorizing the data contained in the training data set 118. The number of evaluation passes made by the machine learning system 102 can be regulated by a target model accuracy that, when reached, ends the evaluation process and the machine learning model 114 is considered ready for deployment.

After deployment, the machine learning model 114 can perform prediction 124 operations with an input data set 126 having the same features 120" as the features 120 in the training data set 118 and the features 120' of the evaluation data set 122. The results of the prediction 124 are included in an output data set 128 consisting of predicted data.

The machine learning system 102 can provide the output data set 128 to a machine learning data evaluation system 130, which can analyze the output data set 128 to identify the application(s) 117 executed by one or more of the mobile communications devices 110 operating in communication with the mobile communications network 108 from within the target data source location 112 to generate application identification data 132. The application identification data 132 can be stored in a historical application usage database 134. The application identification data 132 can be accessed from the historical application usage database 134 and can be utilized by others for purposes of data analytics, targeted advertising, demographic prediction, and/or other purposes not explicitly disclosed herein.

The mobile communications network 108 can be or can include a cellular network that, in turn includes one or more radio access network ("RANs"; not shown) that operate in accordance with one or more cellular telecommunications technologies, including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), LTE-Advanced ("LTE-A"), Worldwide Interoperability for Microwave Access ("WiMAX"), other current 3GPP cellular telecommunications technologies, other future 3GPP cellular telecommunications technologies, combinations thereof, and/or the like. The RAN(s) can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the mobile communications devices 110. Data communications can be provided, in part, by the RAN(s) using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, LTE-A, and/or various other current and future wireless data access technologies. Moreover, a RAN can be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the mobile communications network 108 including one or more RANs operating in accordance with LTE, or more commonly referred to as "4G" technology, although those skilled in the art will appreciate the applicability of the concepts and technologies disclosed herein to other cellular telecommunications technologies, including, in particular, those captured within future generation 3GPP standards, including "5G" and greater generation technologies. Moreover, in some embodiments, the RAN(s) can be or can include one or more virtual RANs ("vRANs").

The mobile communications network 108 also can include one or more core networks, such as one or more evolved packet core ("EPC") networks. The EPC network(s) can one or more mobility management entities ("MME"), one or more application servers ("AS"), one or more home subscriber servers ("HSS"), one or more evolved serving mobile location centers ("ESMLC"), one or more gateway mobile location centers ("GMLC"), one or more serving gateways ("SGW"), one or more packet data network gateways ("PGWs"), some combination thereof, and/or the like. These network functions can be implemented as physical network functions ("PNFs") having hardware and software components. The core network components can additionally or alternatively be provided, at least in part, by virtual network functions ("VNFs"). For example, the core network components can be realized as VNFs that utilize a unified commercial-off-the-shelf ("COTS") hardware and flexible resources shared model with the application software for the respective core network components running on one or more virtual machines ("VMs"). An example cloud computing platform architecture that might be used to implement various core network components embodied as VNFs is described herein below with reference to FIG. 5. Moreover, the core network components can be embodied as VNFs in one or more VNF pools, each of which can include a plurality of VNFs providing a particular core network function.

The functionality of the mobile communications devices 110 can be provided by one or more mobile telephones, smartphones, tablet computers, slate computers, smart watches, smart glasses, other wearable devices, other smart devices, Internet of Things ("IoT") devices, security devices, media playback devices, video game systems, navigation devices, connected cars, laptop computers, notebook computers, ultrabook computers, netbook computers, computers of other form factors, computing devices of other form factors, other computing systems, other computing devices, and/or the like that are configured to communicate with the mobile communications network 108. It should be understood that the functionality of each of the mobile communications devices 110 can be provided by a single device, by two or more similar devices, and/or by two or more dissimilar devices. An example architecture that can be utilized by the mobile communications devices 110 in context of a mobile telephone or smartphone is illustrated and described herein with reference to FIG. 8.

The target data source location 112 is a geo-fenced location where a common event can occur on a scale suitable to harvest real training data in the form of the network data 106 for use by the machine learning system 102 as at least part of the training data set 118. The target data source location 112, in some embodiments, defines a perimeter around an area covered by one or more base stations (not shown) of the mobile communications network 108. In some embodiments, the target data source location 112 can be selected, automatically or at the direction of one or more users, by the network data collection system 104 based upon geographical data, such as data sourced from a geographic information system ("GIS") and/or like system(s). The target data source location 112, in some embodiments, can be or can include an area served by one or more base stations of the mobile communications network 108 that experience a utilization rate higher than surrounding base stations, particularly with regard to bursts of data requests indicative of a common event, such as in the example provided below with regard to an "airplane mode" function of the mobile communications devices 110.

An example of the target data source location 112 is a location containing at least one runway of an airport, where airplanes containing passengers who are users of the mobile communications devices 110 might be requested, required, or their device(s) automatically triggered to enable an airplane mode that turns off one or more communications components, such as those that allow communication with the mobile communications network 108, when the airplane is flying, but allow airplane mode to be disabled when the airplane is on the ground before or after flight, such as during taxiing or parked at a terminal.

Enabling/disabling airplane mode has a typically undesirable side effect of clearing the domain name system ("DNS") cache of a device. This side effect, however, becomes desirable and extremely valuable in understanding network traffic patterns and data harvesting for machine learning model training. This is because an empty DNS cache results in bursts of tens, hundreds, or even thousands of requests from applications, such as the applications 117, 117' operating in both foreground and background conditions on the mobile communications devices 110. When an airplane passenger and user of the mobile communications device 110 is allowed to disable airplane mode, such as after the airplane lands and is taxiing to its destination terminal, often times the airplane passenger is anxious to "catch-up" on application data s/he missed during the flight. This application data might include, for example, instant messages from an instant messaging application such as IMESSAGE, available from Apple Inc., or WHATSAPP, available from WhatsApp Inc.; social networking data from social networking applications such as FACEBOOK, SNAPCHAT, TWITTER, and INSTAGRAM; and/or driving services such as a UBER or LYFT.

Requests for data associated with the applications 117, 117' can be collected by the network data collection system 104 as part of the network data 106 used by the machine learning system 102 in at least part of the training data set 118. Behavior of airplane passengers with regard to the application(s) 117, 117' they use immediately following permission to disable airplane mode is indicative of the popularity of certain applications. Rather than collect the network data 106 from a set of all data associated with requests from the applications 117, 117' executing on the mobile communications devices 110, the network data collection system 104 targets the mobile communications devices 110 operating in communication with the mobile communications network 108 from within the target data source location 112. With a common event, such as disabling airplane mode or other device action, the network data 106 available for use in the training data set 118 is reduced, thereby also reducing the machine learning cycle time needed by the machine learning system 102 to create the machine learning model 114.

The common event of disabling airplane mode is used as one illustrative example of an application of the concepts and technologies disclosed herein. Those skilled in the art will appreciate other common events that can be considered in selecting the target data source location 112 from which the network data collection system 104 is to collect the network data 106. As such, the foregoing example should not be construed as limiting in any way.

In some embodiments, the network data collection system 104 can utilize geo-fencing to establish a perimeter (P) around an area containing one or more base stations, such as eNodeBs in the context of the mobile communications network 108 operating in accordance with LTE. The network data collection system 104 can utilize collection points (i.e., taps) that receive network packets from the base stations positioned both inside (I) and outside (O) of P and filters out (i.e., discards) all packets from O. The packets received from I can be fed as part of the network data 106 to the machine learning system 102. As discussed above, the machine learning system 102 can create the machine learning model(s) 114 based, at least in part, upon the training data set 118 containing features 120 representative of the network data 106.

Although one target data source location 112 is illustrated, multiple target data source locations 112 can be monitored for data collection associated with different geographic locations to create, by the machine learning system 102, geographically-dependent machine learning models, some examples of which target airports as described in the above example, but also might target sports stadiums, tunnels, bowling alleys, gun ranges, and other locations in which groups of people are likely to congregate. These geographically-dependent machine learning models are based upon leveraging common actions among persons near one another, such as in the locations provided in the examples above and elsewhere.

Figure 2:
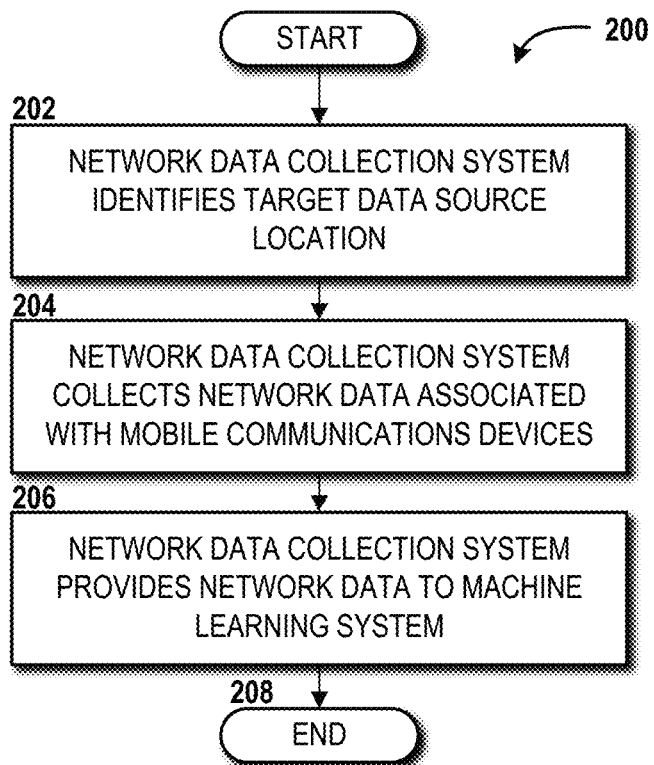
FIG. 2 is a flow diagram illustrating aspects of a method for strategically collecting network data for use by a machine learning system, according to an illustrative embodiment.

Turning now to FIG. 2, aspects of a method 200 for strategically collecting the network data 106 for use by the machine learning system 102 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof are used to refer to causing one or more processors (best shown in FIGS. 5, 6, and 8) of the network data collection system 104, the machine learning system 102, the machine learning data evaluation system 130, the mobile communications devices 110, components of the mobile communications network 108, and/or other systems, devices, architectures, components, networks, or platforms described herein.

For purposes of illustrating and describing some of the concepts of the present disclosure, the methods disclosed herein are described as being performed, at least in part, by the network data collection system 104, the machine learning system 102, or the machine learning data evaluation system 130, executing instructions for implementing the concepts and technologies disclosed herein. It should be understood that additional and/or alternative systems, devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the network data collection system 104 identifies the target data source location 112. The target data source location 112 is a geo-fenced location where a common event can occur on a scale suitable to harvest real training data in the form of the network data 106 for use by the machine learning system 102 as at least part of the training data set 118. The target data source location 112, in some embodiments, defines a perimeter around an area covered by one or more base stations (not shown) of the mobile communications network 108. In some embodiments, the target data source location 112 can be selected, automatically or at the direction of one or more users, by the network data collection system 104 based upon geographical data, such as data sourced from GIS and/or like system(s). The target data source location 112 can be identified based upon knowledge of a common event that occurs among the mobile communications devices 110. For example, a common event might be the mobile communications devices 110 associated with airplane passengers that change from airplane mode enabled to airplane mode disabled once the airplane has landed. Alternatively, a common event might be the mobile communications devices 110 associated with airplane passengers that change from a power-off state to a power-on state.

From operation 202, the method 200 proceeds to operation 204, where the network data collection system 104 collects the network data 106 associated with the mobile communications devices 110 operating in the target data source location 112. In some embodiments, the network data collection system 104 can utilize geo-fencing to establish a perimeter (P) around an area containing one or more base stations, such as eNodeBs in the context of the mobile communications network 108 operating in accordance with LTE. The network data collection system 104 can utilize collection points (i.e., taps) that receive network packets from the base stations positioned both inside (I) and outside (O) of P and filters out (i.e., discards) all packets from O. The packets received from I can be fed as part of the network data 106 to the machine learning system 102. As discussed above, the machine learning system 102 can create the machine learning model(s) 114 based, at least in part, upon the training data set 118 containing features 120 representative of the network data 106.

From operation 204, the method 200 proceeds to operation 206, where the network data collection system 104 provides the network data 106 to the machine learning system 102. From operation 206, the method 200 proceeds to operation 208, where the method 200 ends.

Figure 3:
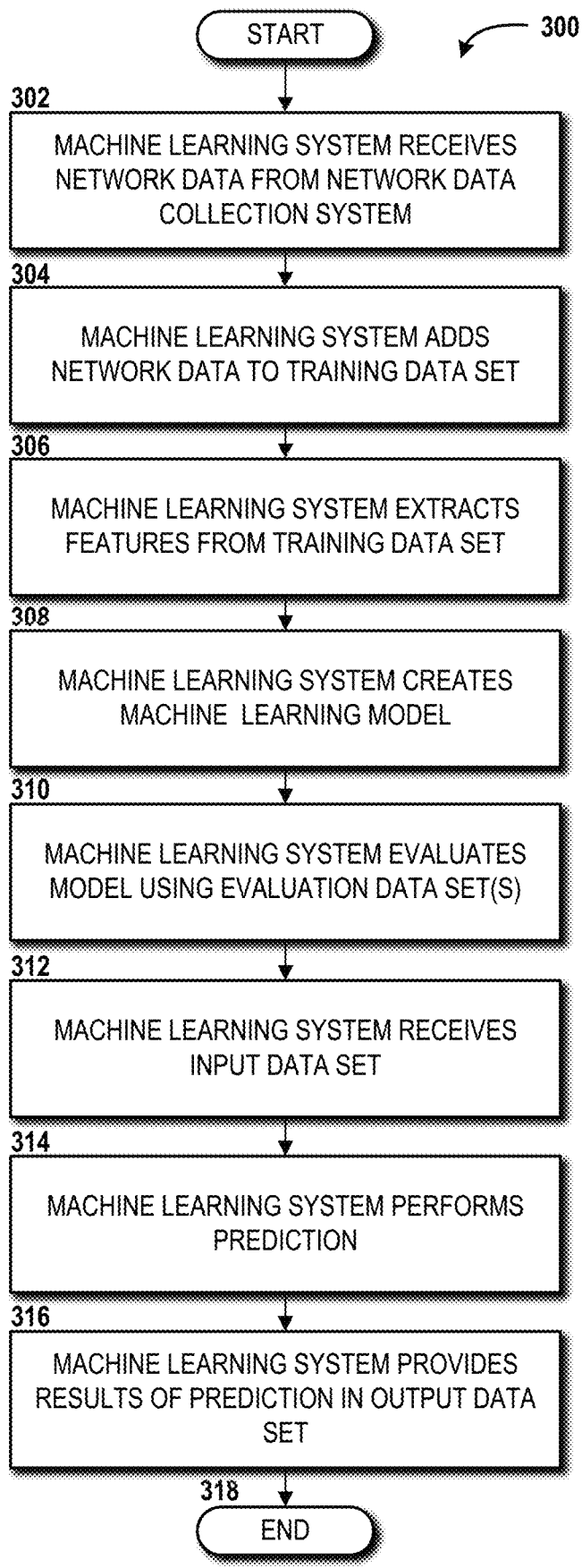
FIG. 3 is a flow diagram illustrating aspects of a method for creating and evaluating a machine learning model based upon data harvested by a network data collection system, according to an illustrative embodiment.

Turning now to FIG. 3, a method 300 for creating and evaluating the machine learning model 114 based upon the training data set 118 harvested, at least in part, by the network data collection system 104 will be described, according to an illustrative embodiment. The method 300 begins and proceeds to operation 302, where the machine learning system 102 receives the network data 106 from the network data collection system 104.

From operation 302, the method 300 proceeds to operation 304, where the machine learning system 102 adds the network data 106 to the training data set 118. From operation 304, the method 300 proceeds to operation 306, where the machine learning system 102 extracts one or more of the features 120 from the training data set 118. From operation 306, the method 300 proceeds to operation 308, where the machine learning system 102 creates the machine learning model 114 using the machine learning algorithm(s) 116 and the features 120 extracted from training data set 118. From operation 308, the method 300 proceeds to operation 310, where the machine learning system 102 evaluates the machine learning model 114 using the evaluation data set(s) 122.

From operation 310, the method 300 proceeds to operation 312, where the machine learning system 102 receives the input data set 126. From operation 312, the method 300 proceeds to operation 314, where the machine learning system 102 performs the prediction 124. From operation 314, the method 300 proceeds to operation 316, where the machine learning system 102 provides results of the prediction 124 in the output data set. 128. From operation 316, the method 300 proceeds to operation 318, where the method 300 ends.

Figure 4:
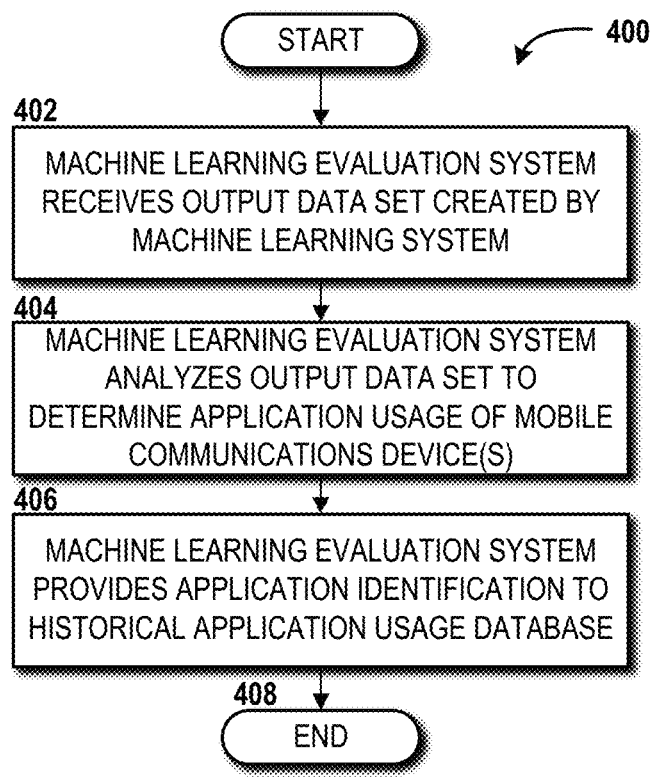
FIG. 4 is a flow diagram illustrating aspects of a method for identifying application usage among a plurality of mobile communications devices operating in communication with a mobile communications network, according to an illustrative embodiment.

Turning now to FIG. 4, a method 400 for identifying application usage among the plurality of mobile communications devices 110 operating in communication with the mobile communications network 108 from the target data source location 112, according to an illustrative embodiment. The method 400 begins and proceeds to operation 402, where the machine learning data evaluation system 130 receives the output data set 128 created by the machine learning system 102. From operation 402, the method 400 proceeds to operation 404, where the machine learning data evaluation system 130 analyzes the output data set 128 to determine application usage of the mobile communications devices 110. For example, information extracted from DNS packets and/or SSL certificate handshakes (i.e., the "CLIENT HELLO" message) can be used for this determination. From operation 404, the method 400 proceeds to operation 406, where the machine learning data evaluation system 130 provides the application identification data 132 to the historical application usage database 134. From operation 406, the method 400 proceeds to operation 408, where the method 400 ends.

Figure 5:
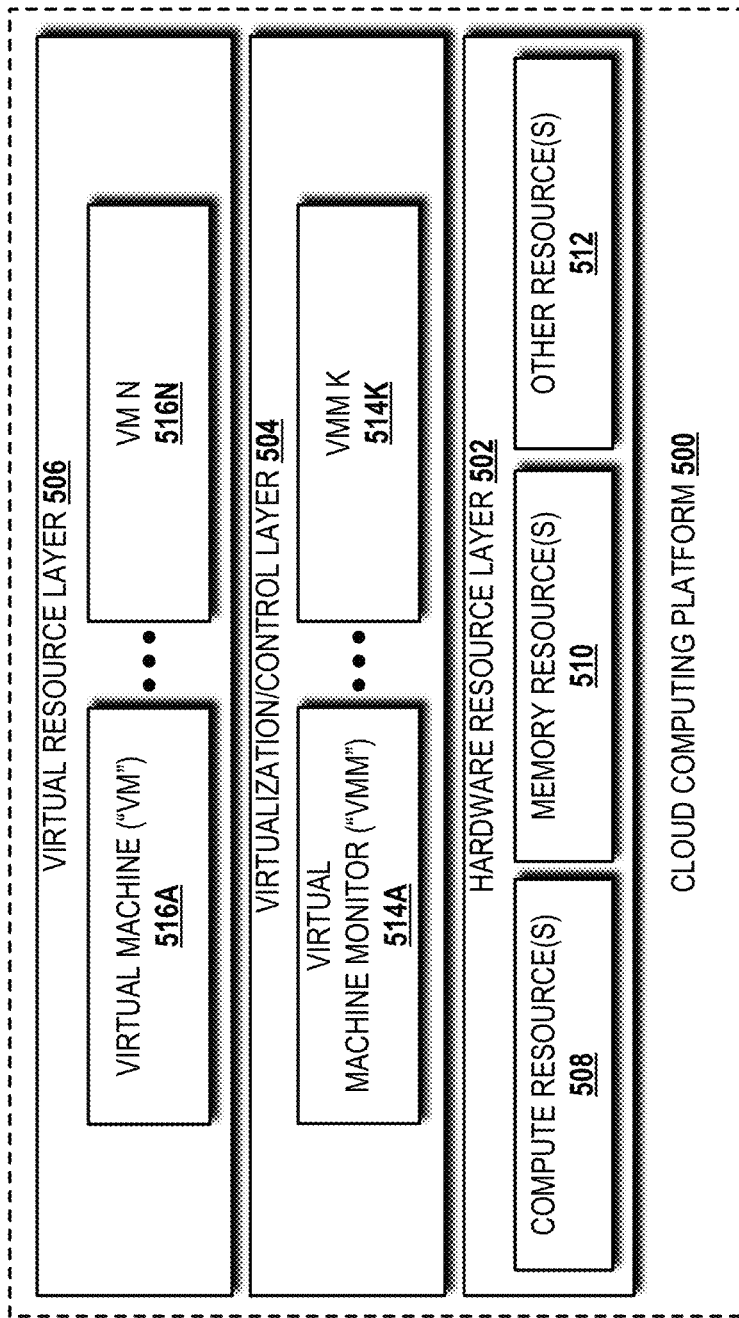
FIG. 5 is a block diagram illustrating a cloud computing platform capable of implementing aspects of the concepts and technologies disclosed herein.

Turning now to FIG. 5, a cloud computing platform 500 capable of implementing aspects of the concepts and technologies disclosed herein will be described, according to an illustrative embodiment. In some embodiments, the machine learning system 102, the network data collection system 104, and/or the machine learning data evaluation system 130 can be implemented on at least a portion of the cloud computing platform 500.

The illustrated cloud computing platform 500 includes a hardware resource layer 502, a virtualization/control layer 504, and a virtual resource layer 506 that work together to perform operations as will be described in detail herein. While connections are shown between some of the components illustrated in FIG. 5, it should be understood that some, none, or all of the components illustrated in FIG. 5 can be configured to interact with one other to carry out various functions described herein. In some embodiments, the components are arranged so as to communicate via one or more networks (best shown in FIG. 7). Thus, it should be understood that FIG. 5 and the following description are intended to provide a general understanding of a suitable environment in which various aspects of embodiments can be implemented, and should not be construed as being limiting in any way.

The hardware resource layer 502 provides hardware resources, which, in the illustrated embodiment, include one or more compute resources 508, one or more memory resources 510, and one or more other resources 512. The compute resource(s) 508 can include one or more hardware components that perform computations to process data, and/or to execute computer-executable instructions of one or more application programs, operating systems, and/or other software. The compute resources 508 can include one or more central processing units ("CPUs") configured with one or more processing cores. The compute resources 508 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 508 can include one or more discrete GPUs. In some other embodiments, the compute resources 508 can include CPU and GPU components that are configured in accordance with a co-processing CPU/GPU computing model, wherein the sequential part of an application executes on the CPU and the computationally-intensive part is accelerated by the GPU. The compute resources 508 can include one or more system-on-chip ("SoC") components along with one or more other components, including, for example, one or more of the memory resources 510, and/or one or more of the other resources 512. In some embodiments, the compute resources 508 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 508 can be or can include one or more hardware components architected in accordance with an ARM architecture, available for license from ARM HOLDINGS of Cambridge, United Kingdom. Alternatively, the compute resources 508 can be or can include one or more hardware components architected in accordance with an x85 architecture, such an architecture available from INTEL CORPORATION of Mountain View, Calif., and others. Those skilled in the art will appreciate the implementation of the compute resources 508 can utilize various computation architectures, and as such, the compute resources 508 should not be construed as being limited to any particular computation architecture or combination of computation architectures, including those explicitly disclosed herein.

The memory resource(s) 510 can include one or more hardware components that perform storage operations, including temporary or permanent storage operations. In some embodiments, the memory resource(s) 510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 508.

The other resource(s) 512 can include any other hardware resources that can be utilized by the compute resources(s) 508 and/or the memory resource(s) 510 to perform operations described herein. The other resource(s) 512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 502 can be virtualized by one or more virtual machine monitors ("VMMs") 514A-514K (also known as "hypervisors"; hereinafter "VMMs 514") operating within the virtualization/control layer 504 to manage one or more virtual resources that reside in the virtual resource layer 506. The VMMs 514 can be or can include software, firmware, and/or hardware that alone or in combination with other software, firmware, and/or hardware, manages one or more virtual resources operating within the virtual resource layer 506.

The virtual resources operating within the virtual resource layer 506 can include abstractions of at least a portion of the compute resources 508, the memory resources 510, the other resources 512, or any combination thereof. These abstractions are referred to herein as virtual machines ("VMs"). In the illustrated embodiment, the virtual resource layer 506 includes VMs 516A-516N (hereinafter "VMs 516"). In some embodiments, one or more of the VMs 516 can execute, at least in part, the machine learning system 102, the network data collection system 104, and/or the machine learning data evaluation system 130.

Figure 6:
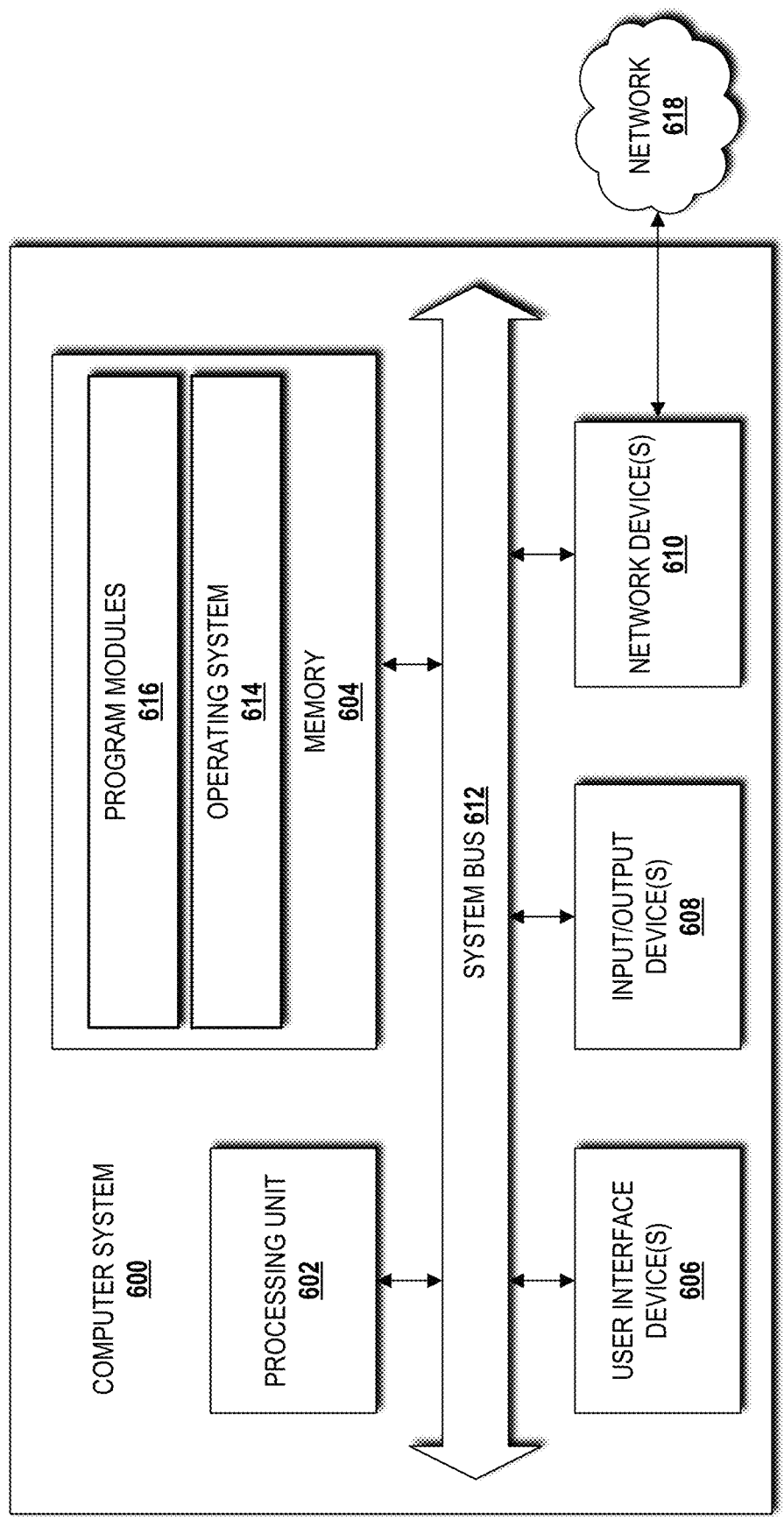
FIG. 6 is a block diagram illustrating an example computer system capable of implementing aspects of the embodiments presented herein.

FIG. 6 is a block diagram illustrating a computer system 600 configured to provide the functionality in accordance with various embodiments of the concepts and technologies disclosed herein. It should be understood, however, that modification to the architecture may be made to facilitate certain interactions among elements described herein. In some embodiments, the machine learning system 102, the network data collection system 104, and/or the machine learning data evaluation system 130 can be configured the same as or similar to the computer system 600.

The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be a wired network such as, but not limited to, a Wide Area Network ("WAN"), a wired Personal Area Network ("PAN"), or a wired Metropolitan Area Network ("MAN"). The network 618 can include the mobile communications network 108.

Figure 7:
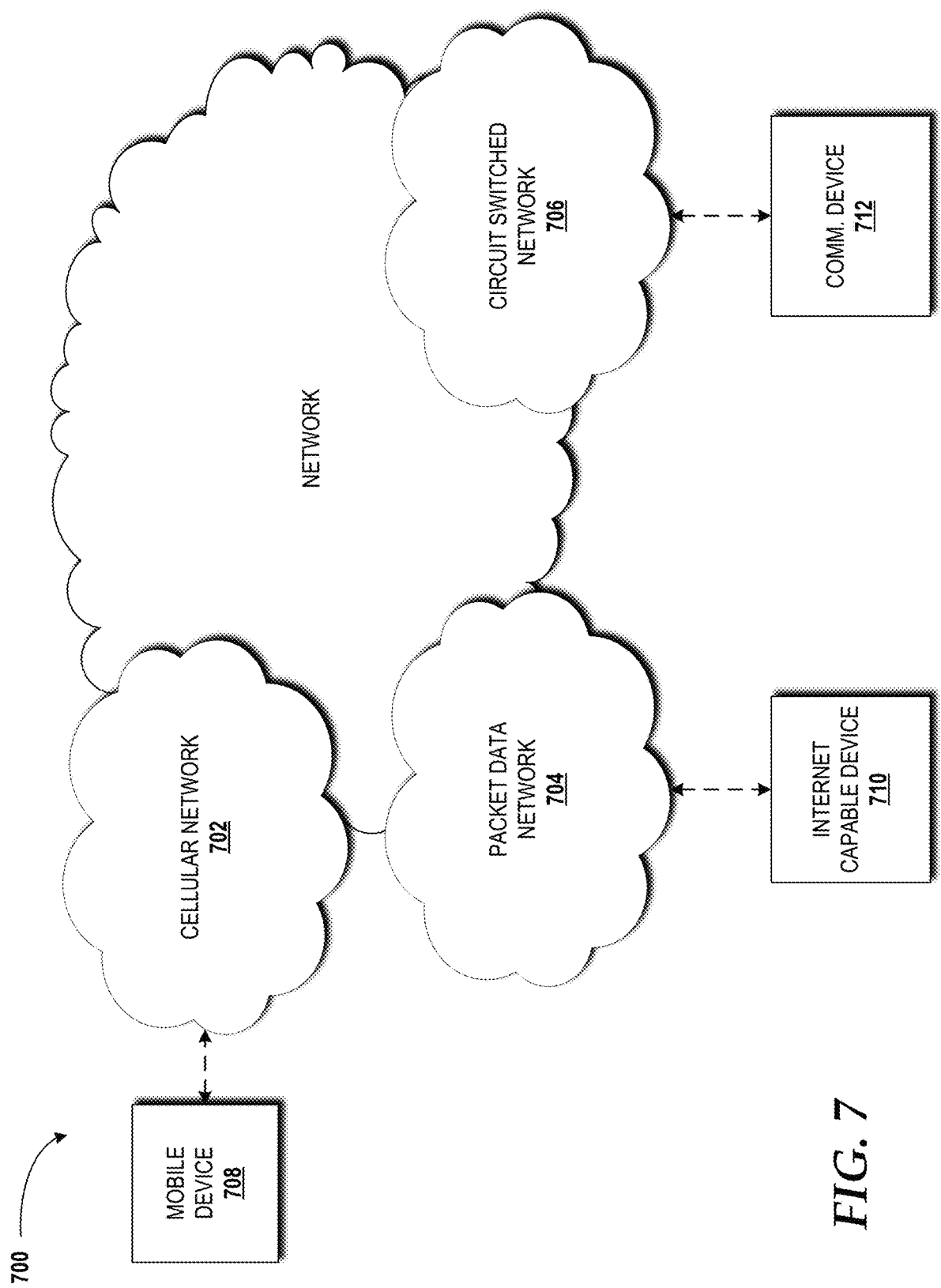
FIG. 7 is a block diagram illustrating details of a network capable of implementing aspects of the embodiments presented herein.

Turning now to FIG. 7, details of a network 700 are illustrated, according to an illustrative embodiment. The network 700 includes a cellular network 702, a packet data network 704, for example, the Internet, and a circuit switched network 706, for example, a PSTN. The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706. In some implementations, the cellular network 702 can include the mobile communications network 108.

A mobile device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSDPA), and HSPA+. The cellular network 702 also is compatible with mobile communications standards such as LTE, or the like, as well as evolved and future mobile standards. The mobile device 708 can include the mobile communications device 110.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a POTS. The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710.

Figure 8:
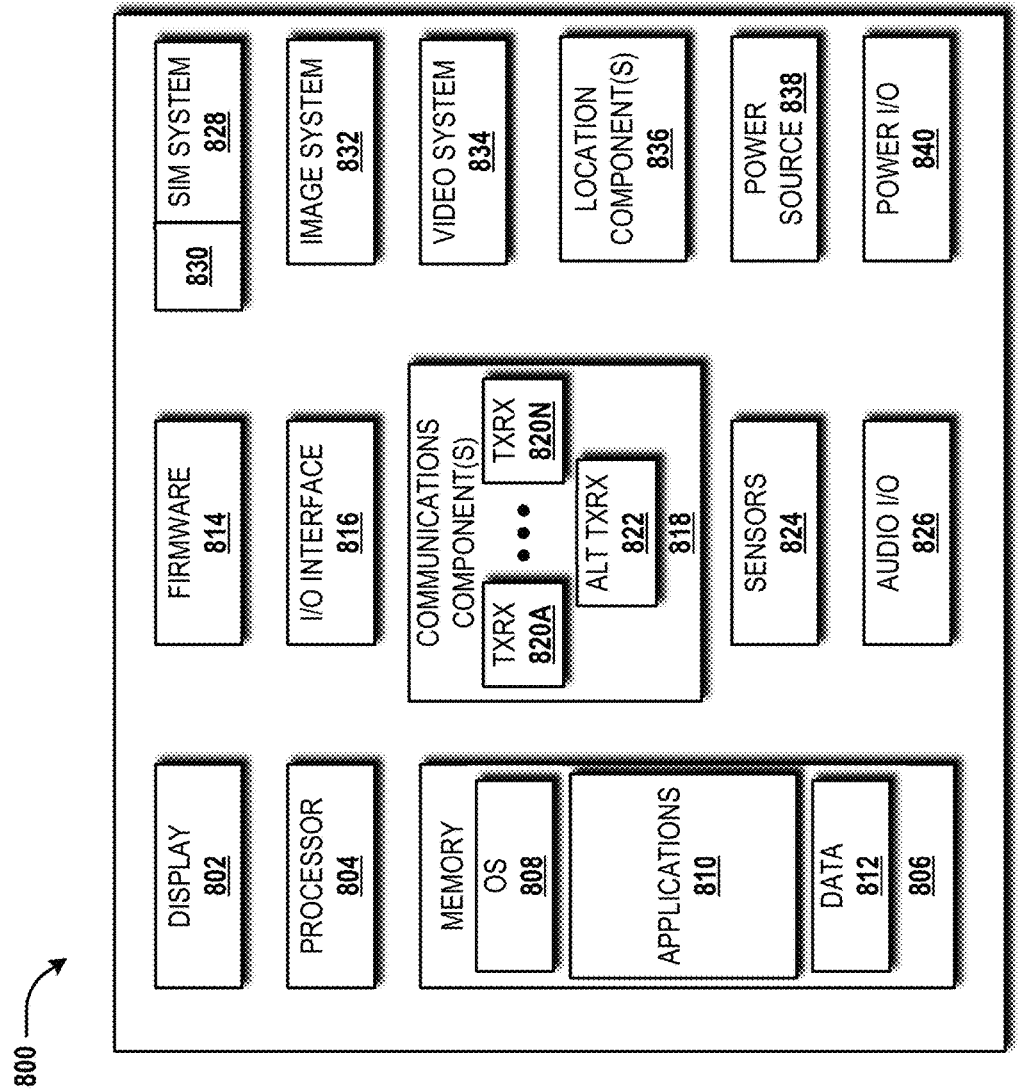
FIG. 8 is a block diagram illustrating an example mobile device capable of implementing aspects of the embodiments disclosed herein.

Turning now to FIG. 8, an illustrative mobile device 800 and components thereof will be described. In some embodiments, the mobile communications device(s) 110 is/are configured the same as or similar to the mobile device 800. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various GUI elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 (e.g., the applications 117, 117'), other computer-executable instructions stored in a memory 806, or the like. In some embodiments, the applications 810 also can include a user interface ("UI") application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. According to various embodiments, the data 812 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 818 includes a multimode communications subsystem for facilitating communications via the cellular network and one or more other networks. The communications component 818 can enable the mobile device 800, embodied as the mobile communications device 110, to communicate with the mobile communications network 108. The airplane mode functionality described herein can be implemented by enabling/disabling the communications component 818 such the mobile device 800 is unable to communicate with the mobile communications network 108.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMA ONE, CDMA2000, LTE, and various other 2G, 2.5G, 3G, 4G, 5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, assisted GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that aspects of data harvesting for machine learning model training have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A machine learning data evaluation system comprising:
a processor; and
a memory having instructions stored thereon that, when executed by the processor, cause the processor to perform operations comprising
receiving an output data set created by a machine learning system,
analyzing the output data set to determine an application usage of an application executed by a plurality of mobile communications devices operating in communication with a mobile communications network from within a target data source location,
providing the application usage to a historical application usage database,
analyzing a second output data set to determine a second application usage of a second application executed by the plurality of mobile communications devices operating in communication with the mobile communications network from within the target data source location, and
providing the second application usage to the historical application usage database.

2. The machine learning data evaluation system of claim 1, wherein receiving the output data set created by the machine learning system comprises receiving a predicted data set created by the machine learning system.

3. The machine learning data evaluation system of claim 1, wherein the target data source location comprises a location in which a common event has occurred.

4. The machine learning data evaluation system of claim 3, wherein the common event comprises disabling an airplane mode.

5. The machine learning data evaluation system of claim 4, wherein the location comprises an airport runway.

6. The machine learning data evaluation system of claim 3, wherein the common event comprises a device action performed by each of the plurality of mobile communications devices.

7. The machine learning data evaluation system of claim 3, wherein the common event comprises changing from a power-off state to a power-on state.

8. A computer-readable storage medium having computer-executable instructions stored thereon that, when executed by a processor, cause the processor to perform operations comprising:
receiving an output data set created by a machine learning system;
analyzing the output data set to determine an application usage of an application executed by a plurality of mobile communications devices operating in communication with a mobile communications network from within a target data source location;
providing the application usage to a historical application usage database;
analyzing a second output data set to determine a second application usage of a second application executed by the plurality of mobile communications devices operating in communication with the mobile communications network from within the target data source location; and
providing the second application usage to the historical application usage database.

9. The computer-readable storage medium of claim 8, wherein receiving the output data set created by the machine learning system comprises receiving a predicted data set created by the machine learning system.

10. The computer-readable storage medium of claim 8, wherein the target data source location comprises a location in which a common event has occurred.

11. The computer-readable storage medium of claim 10, wherein the common event comprises disabling an airplane mode.

12. The computer-readable storage medium of claim 11, wherein the location comprises an airport runway.

13. The computer-readable storage medium of claim 10, wherein the common event comprises a device action performed by each of the plurality of mobile communications devices.

14. The computer-readable storage medium of claim 10, wherein the common event comprises changing from a power-off state to a power-on state.

15. A method comprising:
receiving, by a machine learning data evaluation system comprising a processor, an output data set created by a machine learning system;
analyzing, by the machine learning data evaluation system, the output data set to determine an application usage of an application executed by a plurality of mobile communications devices operating in communication with a mobile communications network from within a target data source location;

providing, by the machine learning data evaluation system, the application usage to a historical application usage database;

analyzing, by the machine learning data evaluation system, a second output data set to determine a second application usage of a second application executed by the plurality of mobile communications devices operating in communication with the mobile communications network from within the target data source location; and providing, by the machine learning data evaluation system, the second application usage to the historical application usage database.

16. The method of claim 15, wherein receiving the output data set created by the machine learning system comprises receiving a predicted data set created by the machine learning system.

17. The method of claim 15, wherein the target data source location comprises a location in which a common event has occurred.

18. The method of claim 17, wherein the common event comprises disabling an airplane mode.

19. The method of claim 17, wherein the common event comprises a device action performed by the plurality of mobile communications devices.

20. The method of claim 17, wherein the common event comprises changing from a power-off state to a power-on state.

* * * * *